United States Patent [19]
Chaya

[11] Patent Number: 5,731,929
[45] Date of Patent: Mar. 24, 1998

[54] DISK RECORDING/REPRODUCTION APPARATUS WITH DISK CLAMP MECHANISM COMPRISING A CADDIE HOLDING A FIRST DISK AND A SPINDLE CENTERING A SECOND DISK

[75] Inventor: Masahiko Chaya, Yokohama, Japan

[73] Assignee: Canon Kabushiki Kaisha, Tokyo, Japan

[21] Appl. No.: 638,580

[22] Filed: Apr. 29, 1996

[30] Foreign Application Priority Data

| May 1, 1995 | [JP] | Japan | 7-107483 |
| Jul. 5, 1995 | [JP] | Japan | 7-169628 |

[51] Int. Cl.⁶ .................... G11B 17/028; G11B 23/00
[52] U.S. Cl. .................... 360/99.12; 369/270; 369/271
[58] Field of Search .................... 360/99.12, 99.05, 360/99.08, 133; 369/270, 271, 282, 289, 290, 291

[56] References Cited

U.S. PATENT DOCUMENTS 5,268,784  12/1993  Chaya ................... 359/214
5,533,000   7/1996  Koizumi ................ 369/270
5,586,105  12/1996  Mizuno et al. .......... 369/270

FOREIGN PATENT DOCUMENTS

| 5-303862 | 11/1993 | Japan | 369/270 |
| 6150504  | 5/1994  | Japan . | |
| 3004098  | 8/1994  | Japan . | |
| 6-275048 | 9/1994  | Japan | 369/270 |
| 7-006467 | 1/1995  | Japan . | |
| 7-240084 | 9/1995  | Japan . | |
| 8-045222 | 2/1996  | Japan . | |

*Primary Examiner*—Stuart S. Levy
*Assistant Examiner*—William R. Korzuch
*Attorney, Agent, or Firm*—Fitzpatrick, Cella, Harper & Scinto

[57] ABSTRACT

A clamping mechanism for clamping both a mechanically clampable type of disk and a magnetically clampable type of disk includes a magnet provided on a turntable for clamping the magnetically clampable disk, and a fitting portion and a sub-turntable portion of a caddie for clamping the mechanically clampable disk. When the caddie is loaded on the apparatus, the sub-turntable is fixed on the turntable by the magnet.

2 Claims, 11 Drawing Sheets

5,731,929

DISK RECORDING/REPRODUCTION APPARATUS WITH DISK CLAMP MECHANISM COMPRISING A CADDIE HOLDING A FIRST DISK AND A SPINDLE CENTERING A SECOND DISK

BACKGROUND OF THE INVENTION

1. Field of the Invention

The present invention relates to a recording/reproduction apparatus for a disk-shaped information medium and, more particularly, to a disk recording/reproduction apparatus which can load different types of disk media into the recording/reproduction apparatus and can rotate them.

2. Related Background Art

Conventionally, upon loading a disk-shaped recording medium (to be referred to as a disk hereinafter) into a drive unit of a disk recording/reproduction apparatus, as a method of setting the disk on a turntable, two methods, i.e., a magnet clamp method and a mechanical clamp method, are normally used.

A disk clamp mechanism based on the conventional mechanical clamp method has the structure shown, in e.g., FIG. 1. The mechanism includes a disk 101 having a central hole 102, a spindle 150 for rotating the disk, a turntable 151 for rotating the disk set thereon, a tapered cone 152 which is vertically slidable along the spindle 150 to perform centering of the disk on the turntable 151, a compression coil spring 153 for biasing the tapered cone 152 upward in FIG. 1, and a disk pressing member 154 for pressing the disk from above. A magnet is fixed to the disk pressing member 154 to magnetically attract the disk toward the turntable 151 side.

In the disk clamp mechanism with the above-described arrangement, the tapered cone 152 is inserted into the central hole 102 of the disk, and the peripheral portion of the tapered cone 152 is fitted in tight contact with the central hole 102 of the disk to perform centering of the disk. In this state, the disk 101 is fixed to the turntable 151 by the disk pressing member 154 by the attraction force between the magnet fixed to the disk pressing member and the turntable 151.

On the other hand, a disk clamp mechanism based on the conventional magnet clamp method has a structure, as shown in, e.g., FIG. 2. The mechanism includes a disk 111, a hub 112 consisting of a magnetic material, and a magnet 113 for magnetically attracting the hub 112 to a turntable.

In the disk clamp mechanism with the above arrangement, a spindle 150 is inserted into the central hole of the hub 112 to perform centering. In this state, the disk 111 is fixed to a turntable 156 by the attraction force between a magnet 157 and the hub 112.

As a versatile disk clamp mechanism, which can set and clamp different types of disks, applied to the above-mentioned two different clamp methods, on a single turntable, a mechanism described in Japanese Laid-Open Patent Application No. 6-150504 is known, as shown in, e.g., FIGS. 3A and 3B.

In this prior art, a tapered cone for performing centering of a disk without any hub (see FIG. 3A), and a spindle for performing centering of a disk with a hub (see FIG. 3B) are coaxially arranged, and the mechanism can selectively set and drive these disks on a single spindle and turntable using a magnetic force.

As another versatile disk clamp mechanism, as shown in FIG. 4, a mechanism described in Utility Model Application No. 3004098 is known. Since this mechanism has two disk support surfaces with different heights on a single turntable, disks with different clamp areas can be clamped on the single turntable.

However, despite the disk clamp mechanism shown in FIGS. 3A and 3B or FIG. 4 is arranged, when disk support positions are different in the radial direction of the disk, as shown especially in FIG. 4, the following problem is posed independently of the clamp methods. More specifically, in a disk clamp mechanism for a disk which is loaded into a cartridge in advance, when the cartridge has a small turntable insertion hole in correspondence with the small support diameter of the disk, if the turntable insertion hole is larger than the support diameter of another disk, a support portion of the turntable side, that supports the larger support-diameter portion, spatially interferes with the cartridge case, and it becomes impossible to support the cartridge storage type disk on the turntable.

SUMMARY OF THE INVENTION

The present invention has been made in consideration of the above situation, and has as its object to provide a versatile disk recording/reproduction apparatus with a disk clamp mechanism which can set different types of disks on a turntable even when the support diameter of one disk is larger than the diameter of a turntable insertion hole formed on a cartridge case of the other cartridge storage type disk.

The above-mentioned object is achieved by the following characteristic arrangement.

That is, there is provided a disk apparatus which can cope with a first disk having a central hole, and a second disk, which has a central hole smaller than the central hole of the first disk and has a hub containing a magnetic material, comprising:

a spindle, which is fitted in the central hole of the second disk, to perform centering of the second disk; and a turntable arranged on the spindle, the turntable comprising:

a magnet for attracting the hub so as to hold the second disk on the turntable;

a first support surface, which contacts a disk surface of the second disk at a position outside the hub and supports the second disk; and a caddie for holding the first disk upon loading the first disk into the apparatus, and the caddie comprising:

a fitting portion, which is fitted into the central hole of the first disk to perform centering of the first disk and comprises a magnetic portion to be attracted by the magnet; and a sub-turntable, which is arranged to oppose the fitting portion to sandwich the held first disk therebetween, the sub-turntable being supported by the turntable upon loading the caddie into the apparatus, and clamping the first disk in cooperation with the fitting portion.

Also, there is provided a disk apparatus which can cope with a first disk having a central hole, and a second disk, which has a central hole smaller than the central hole of the first disk and has a hub containing a magnetic material, comprising:

a spindle, which is fitted in the central hole of the second disk to perform centering of the second disk; and a turntable arranged on the spindle, the turntable comprising:

a magnet for attracting the hub so as to hold the second disk on the turntable;

a first support surface which contacts a disk surface of the second disk at a position outside the hub and supports the second disk; and a clamp member for clamping the first disk in cooperation with the turntable, and the clamp member comprising:

a fitting portion, which is fitted into the central hole of the first disk to perform centering of the first disk and comprises a magnetic portion to be attracted by the magnet; and a second support surface, which contacts a disk surface of the first disk at a position outside the first support surface and clamps the first disk in cooperation with the first support surface.

The above and other objects and features will become apparent from the following description of the embodiments.

DETAILED DESCRIPTION OF THE PREFERRED EMBODIMENTS

Figure 6:
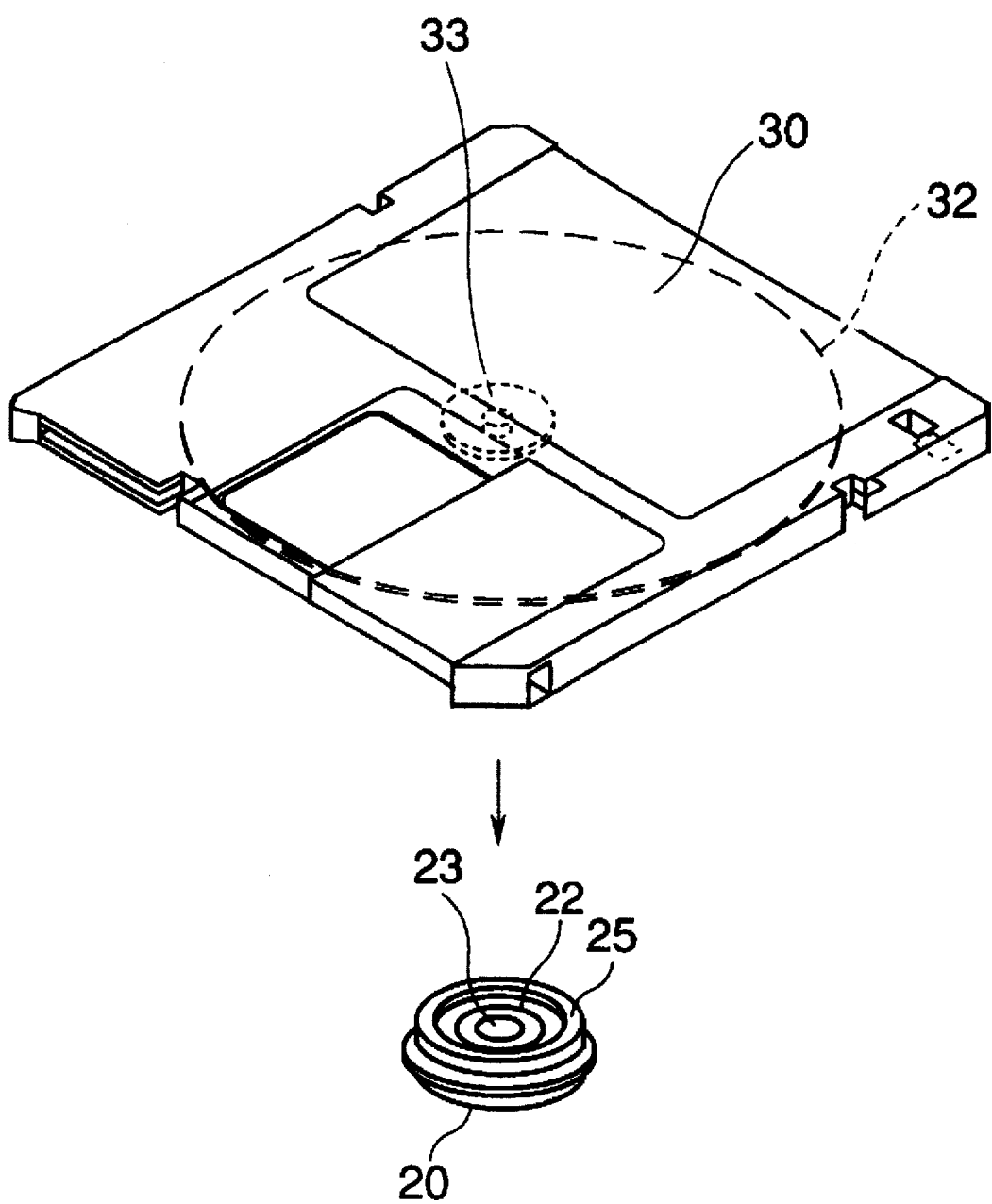
FIG. 6 is a perspective view for explaining a case wherein the disk clamp mechanism according to the first embodiment of the present invention is applied to a first disk.
Figure 7:
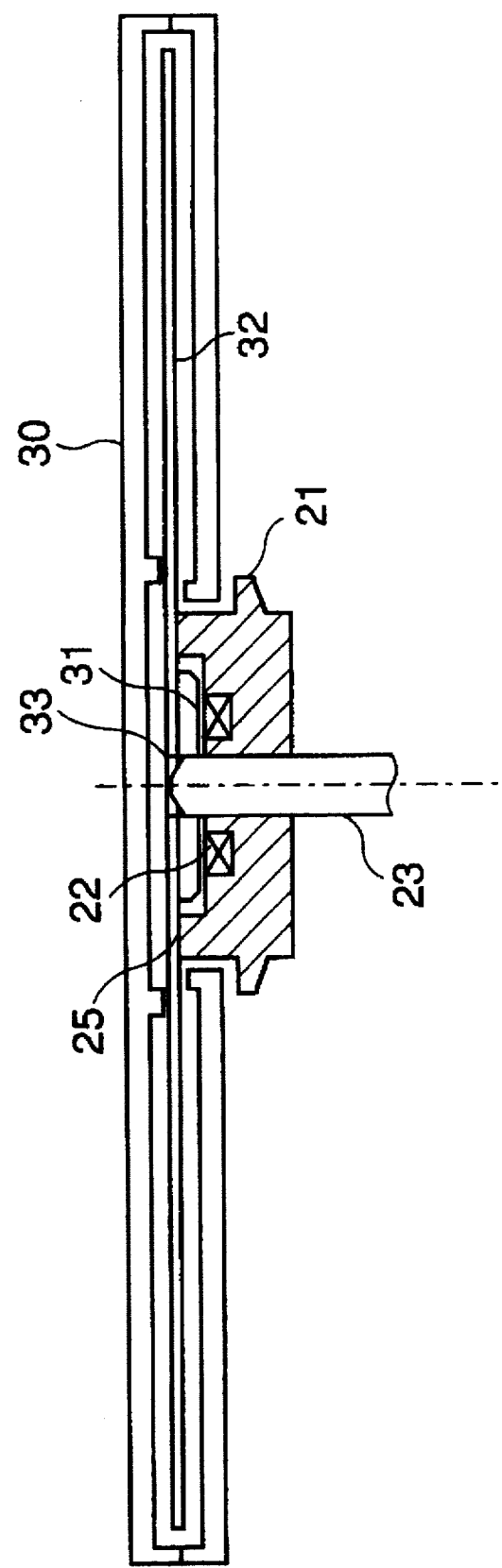
FIG. 7 is a side sectional view showing a state wherein the first disk is set on the disk clamp mechanism according to the first embodiment of the present invention.

The first embodiment of the present invention will be described in detail hereinafter with reference to FIGS. 5 to 8. FIGS. 6 and 7 show a disk clamp mechanism to be applied to a cartridge storage type disk, such as an ISO standard 3.5" MOD. In this case, the clamp mechanism comprises a spindle 23 which performs centering of a disk set at the recording/reproduction position in the apparatus, and is rotated, and a turntable 20 on which the disk is set. A magnet 22 arranged on the turntable 20 attracts and holds the disk.

In this disk clamp mechanism, for a first disk having a hub 31, consisting of a magnetic material, around a central hole 33 to be fitted on the spindle 23, i.e., a disk 32 stored in a cartridge case 30 in this embodiment, the above-mentioned magnet 22 is arranged to oppose the hub 31, and the above-mentioned turntable 20 has an annular support portion 25 which contacts the disk surface outside the hub 31. The support portion 25 determines the position, in the axial direction of the spindle 23, of the disk.

Figure 1:
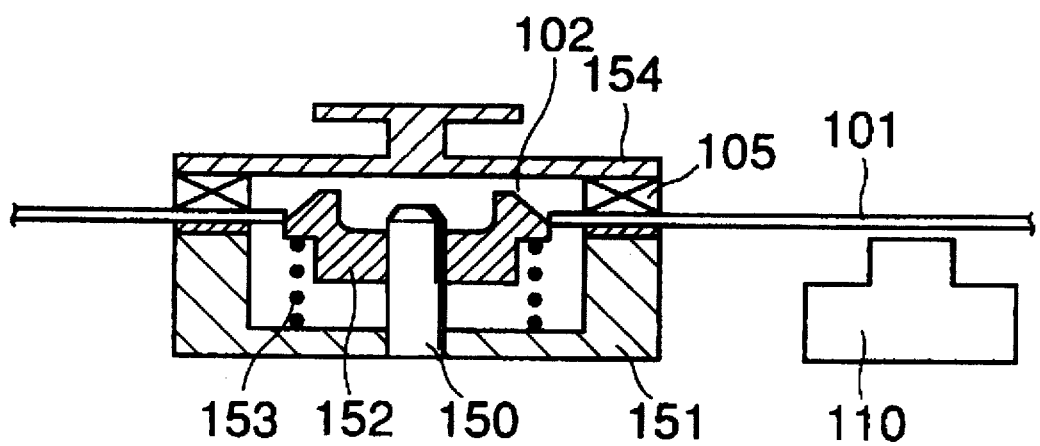
FIG. 1 is a sectional view showing a disk clamp mechanism based on a conventional mechanical clamp method.
Figure 2:
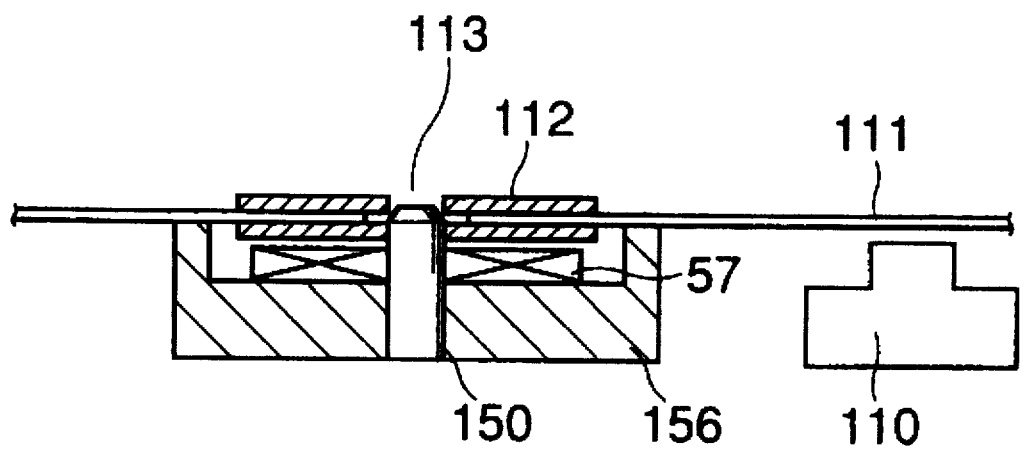
FIG. 2 is a sectional view showing a disk clamp mechanism based on a conventional magnet clamp mechanism.
Figure 3A:
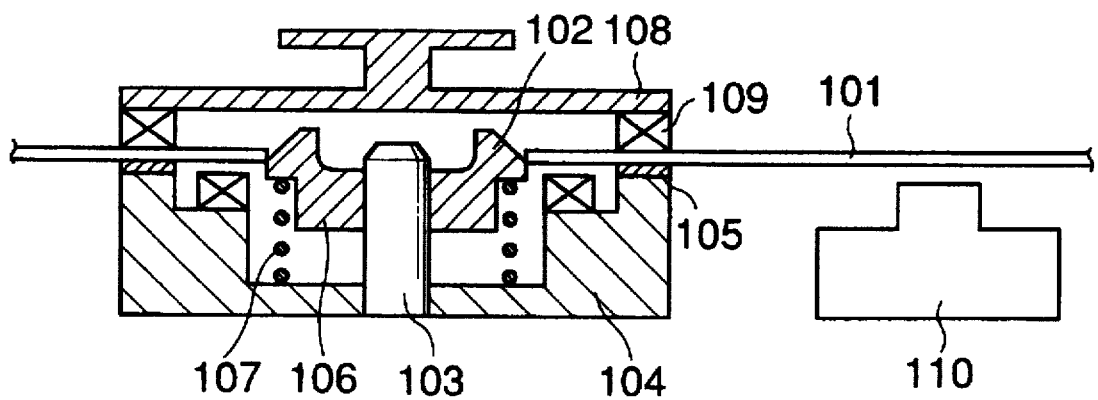
FIGS. 3A and 3B are sectional views showing a state wherein disks of two different clamp methods are clamped by a single disk clamp mechanism.
Figure 3B:
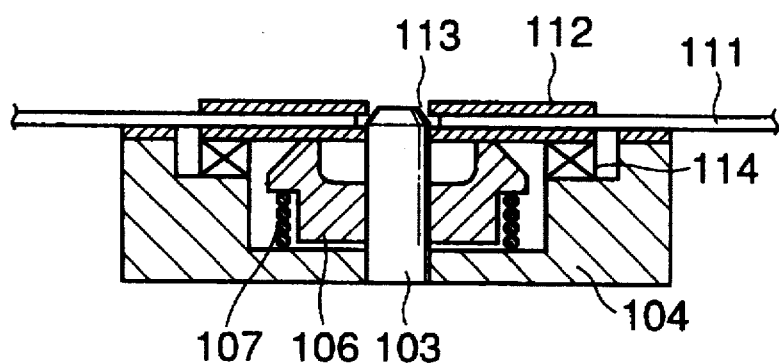
Figure 4:
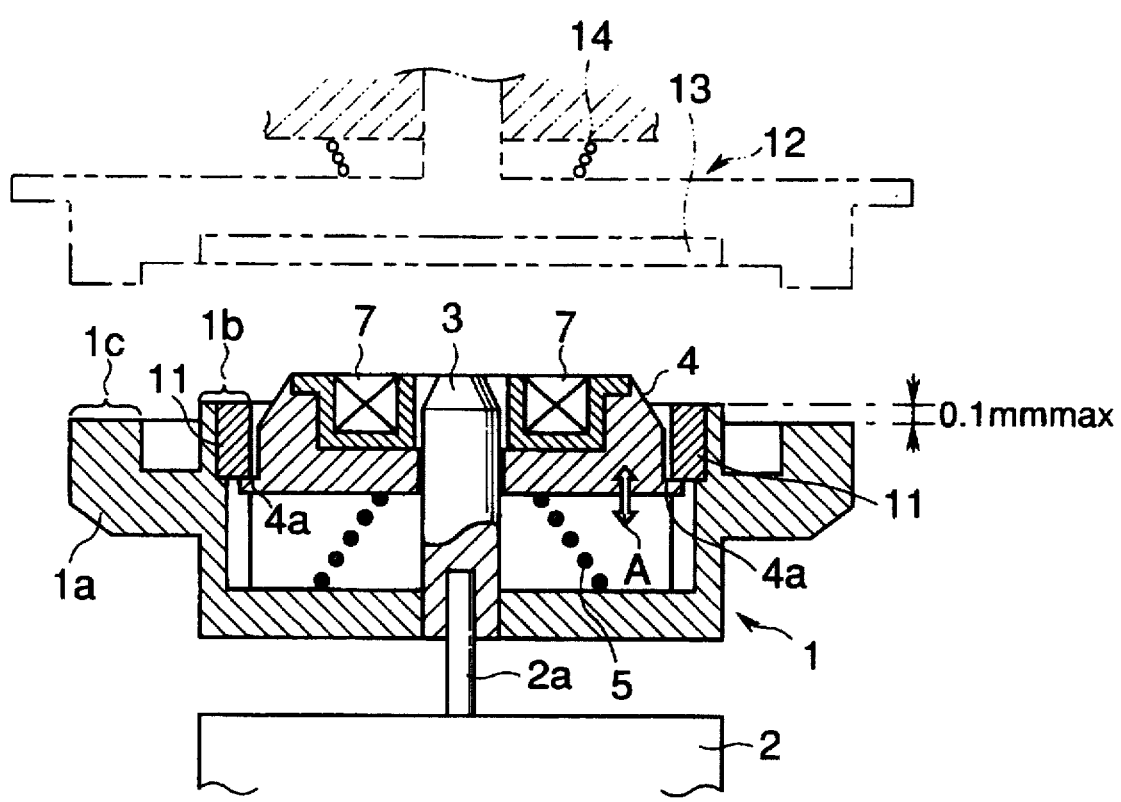
FIG. 4 is a sectional view especially showing a state wherein disks of two different clamp methods, which have different clamp areas, are clamped by a single disk clamp mechanism.
Figure 5:
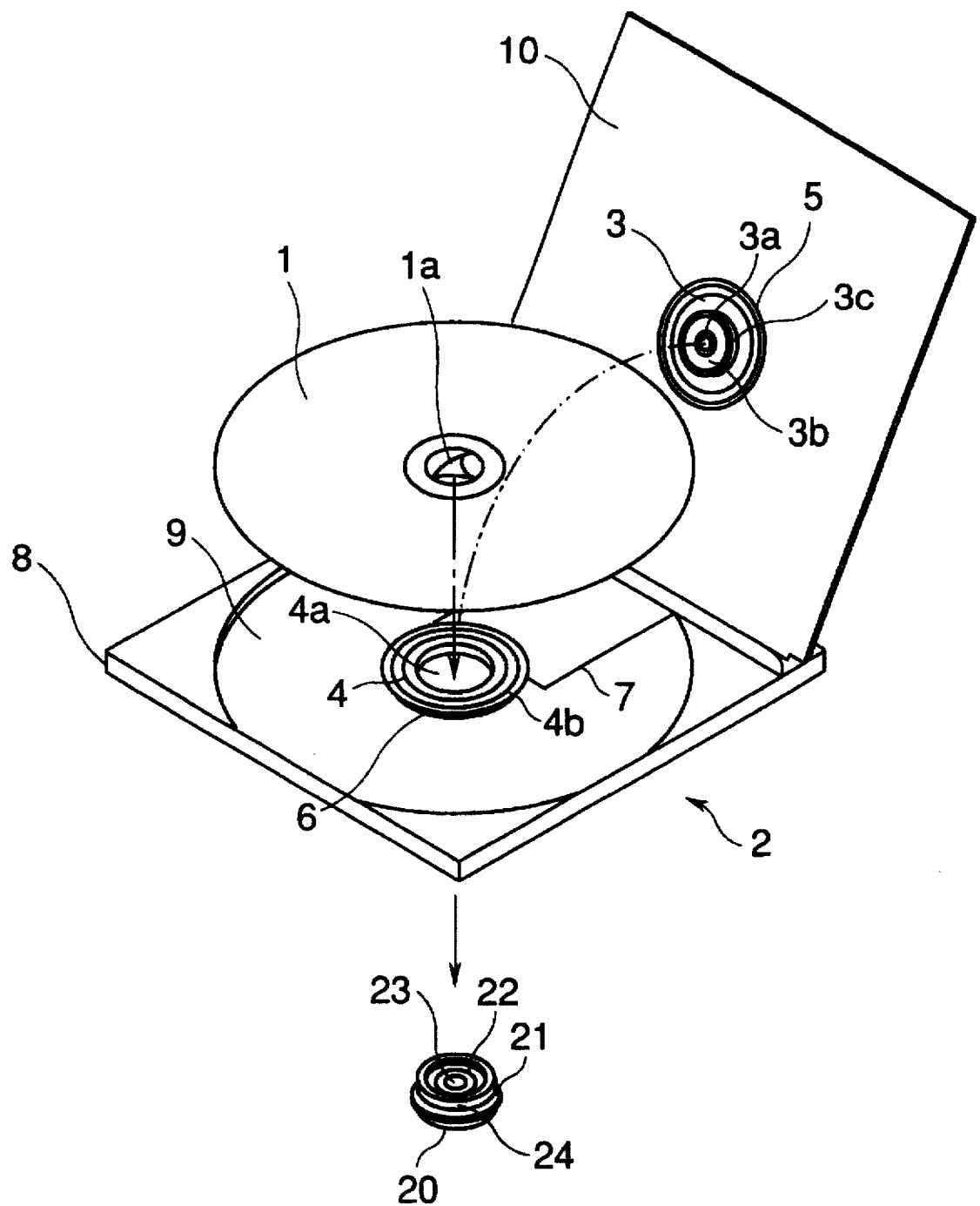
FIG. 5 is a perspective view for explaining a case wherein a disk clamp mechanism according to the first embodiment of the present invention is applied to a second disk.
Figure 8:
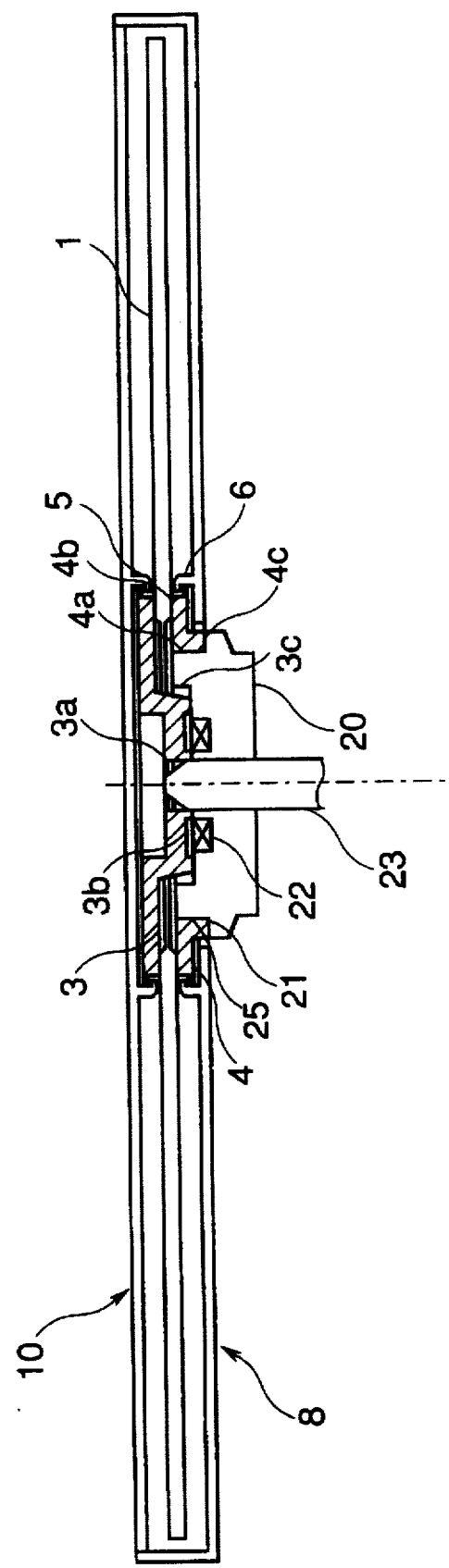
FIG. 8 is a side sectional view showing a state wherein the second disk is stored in a cartridge case and is set on the disk clamp mechanism according to the first embodiment of the present invention.

On the other hand, as shown in FIGS. 5 and 8, as for a second disk, such as a compact disk having a central hole 1a larger than the central hole 33, a disk 1 is set on the turntable 20 via a clamper 3 and a sub-turntable 4, which clamps the disk 1 in combination with the clamper 3 and is set on the turntable 20.

That is, the clamper 3 has a fitting/holding portion 3c (in this embodiment, its outer peripheral portion has a tapered cone shape) to be fitted in a central hole 1a of the disk 1, a central hole 3a to be fitted on the spindle 23, and a to-be-attracted portion 3b which opposes the magnet 22 and consists of a magnetic material.

The above-mentioned clamper 3 and the sub-turntable 4 are respectively rotatably mounted on an upper portion (case lid) 10 and a lower portion (case main body) 8 of a cartridge case 2, which is free to open/close vertically. The second disk 1 is loaded into the cartridge case, and is clamped vertically between the clamper 3 and the sub-turntable 4 in the closed state of the cartridge case.

More specifically, the support portion 25 is located outside the fitting/holding portion 3c, and the sub-turntable 4 has an annular support portion 4b which contacts the disk surface of the second disk 1 to hold the second disk 1 at the same height level as that of the first disk 32. Note that the sub-turntable 4 is detachably fitted on the turntable 20 while its annular lower surface 4c is placed on a rest portion 21 formed on the outer periphery of the turntable 20. On the other hand, the cartridge case 2 has, on its lower portion 8, an opening portion 7 which opposes the moving region of a pickup head used for recording/reproduction, and a space portion 9 for storing the disk 1.

In this arrangement, as shown in FIG. 7, when the turntable 20 is inserted into the opening formed at the center of the lower surface of the cartridge case 30, the hub 31 is magnetically attracted by the magnet 22, and the central hole 33 is fitted on the spindle 23, thereby determining the radial position of the disk. On the other hand, the lower surface of the first disk 32 contacts and engages with the top surface of the support portion 25 of the turntable 20, thus determining the position, in the axial direction of the spindle 23, of the disk. In this state, the clamping operation is completed.

In this case, when the support portion 25 is formed at a position that does not interfere with the opening portion, opposing the pickup head, and the lower surface of the cartridge case 30, the disk clamp mechanism of the present invention can be applied to the above-mentioned cartridge storage type disk 32.

As shown in FIG. 5, the second disk 1 is stored in the space portion 9 of the cartridge case 2, and the upper portion 10 is closed. At the same time, the fitting/holding portion 3c of the clamper 3 is fitted into the central hole 1a of the disk 1. In this case, a snap fit holding member (not shown), provided to the lower portion 8, maintains the closed state. The disk 1 in this state is loaded into the disk recording/reproduction apparatus together with the cartridge case 2, and is clamped on the turntable 20 via the clamper 3 and the sub-turntable 4, as shown in FIG. 8.

That is, when the turntable 20 is inserted into the central opening portion formed on the lower portion 8 of the cartridge case 2, the to-be-attracted portion 3b of the clamper 3 is magnetically attracted by the magnet 22, and the central hole 3a of the clamper 3 is fitted on the spindle 23. Since the clamper 3 slightly moves downward due to the magnetic attraction, the disk 1 contacts the support surface 4b of the sub-turntable 4, and the central hole 4a is fitted on the outer circumferential portion of the support portion 25 of the turntable 20. Also, the lower surface 4c contacts the upper surface of the rest portion 21, thus completing the clamp operation.

In this case, since the central hole 1a of the disk 1 is fitted on the tapered portion 3c of the clamper 3 aligned by the spindle 23, the radial position of the disk is determined. On the other hand, since the clamper 3 slightly moves downward, the lower surface 4c contacts the rest portion 21 via the disk 1, thus determining the position, in the axial direction of the spindle 23, of the disk.

In this embodiment, the rest portion 21 formed on the turntable 20 protrudes from the outer periphery of the turntable 20, but may have a stepped axial shape. Furthermore, the rest portion 21 need not always be formed into an annular shape but may be formed intermittently in the circumferential direction at least, e.g., at three positions.

Figure 9:
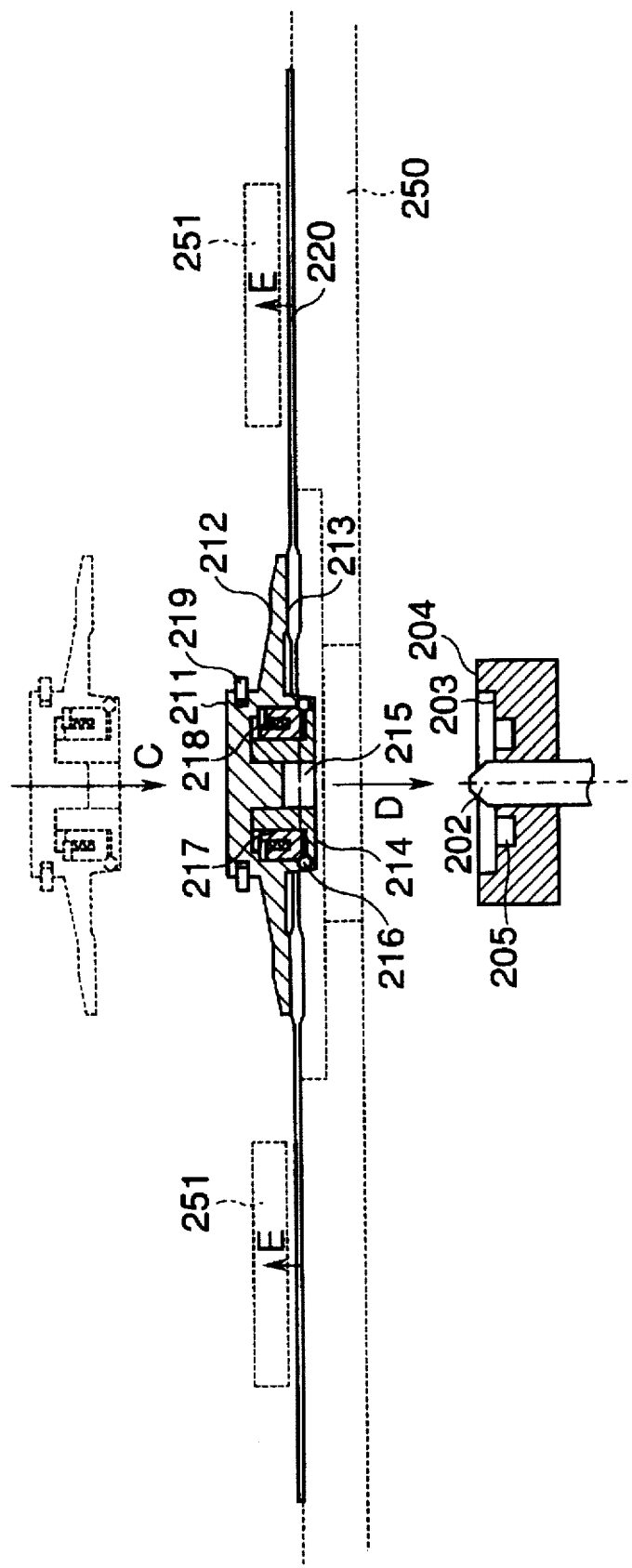
FIG. 9 is a side sectional view for explaining the setting state of a clamper, a spindle motor, and a first disk according to the second embodiment of the present invention.
Figure 10:
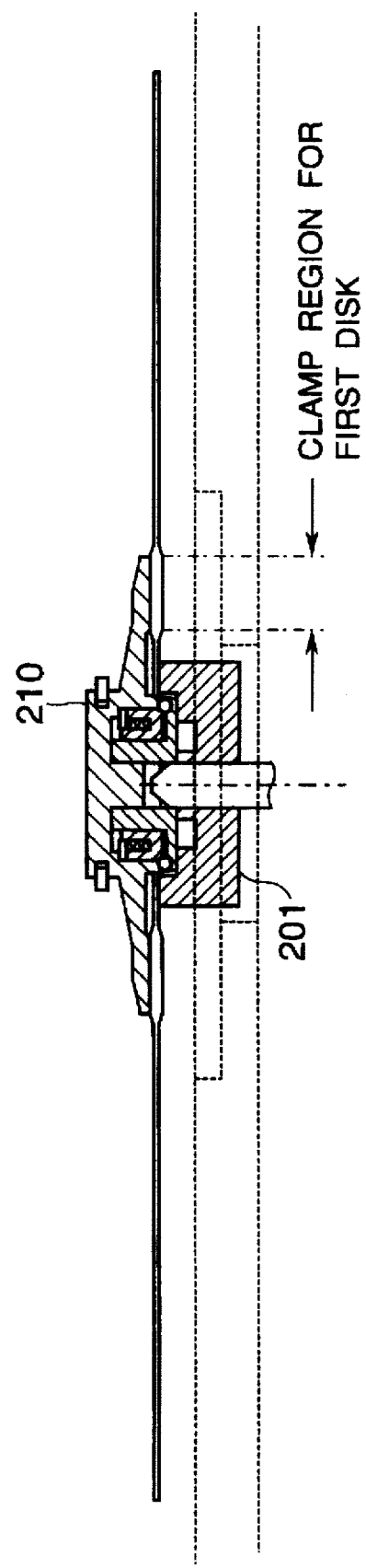
FIG. 10 is a side sectional view the setting state in correspondence with FIG. 9.
Figure 11:
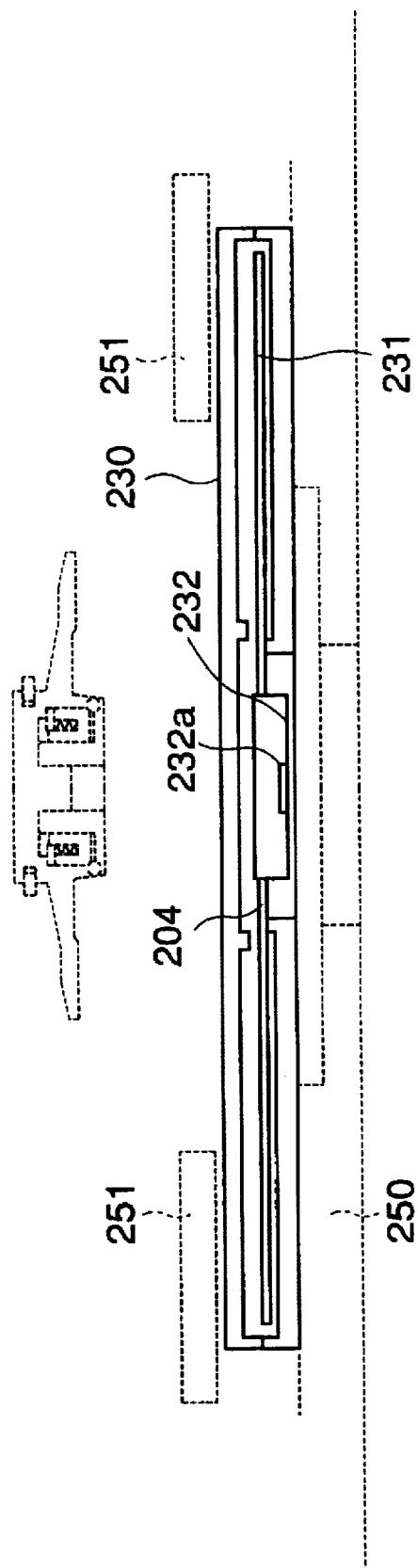
FIG. 11 is a side sectional view showing a state wherein a second disk loaded into a disk cartridge is set on a turntable in the second embodiment of the present invention.
Figure 12:
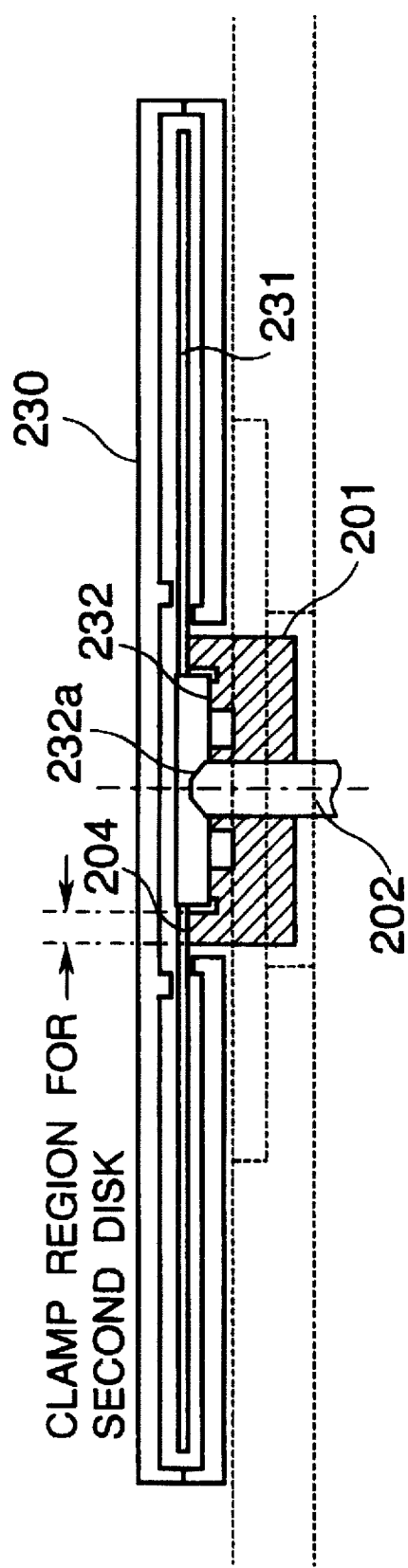
FIG. 12 is a side sectional view showing the setting state in correspondence with FIG. 11.

The second embodiment of the present invention will be described below with reference to FIGS. 9 to 12. FIGS. 9 and 10 are side sectional views showing the setting state of a first disk, such as a CD (compact disk), having only the central hole. FIGS. 11 and 12 are side sectional views for explaining the setting state of a second disk which has a central hole smaller than that of the first disk and has a hub including a magnetic material, and more particularly, a disk such as a 3.5" MOD loaded into a cartridge, in which a central opening portion, for receiving the shaft of a spindle motor, is defined by a hole smaller than the diameter of a clamp region for the first disk. That is, the second embodiment of the present invention comprises a mechanism for selectively setting the two different types of disks on the shaft of a single spindle motor 201. The mechanism will be described in detail below.

When the first disk (220) is to be set, the first disk 220 is conveyed by a tray 250 (broken line) arranged in a disk apparatus to a position at which the central position of a clamper 210 roughly matches that of the disk 220. The clamper 210 is constituted by a pressing member 217 which biases balls 216 in the direction of an arrow D in FIG. 9 using a compression coil spring 218, a holding portion 211 formed with a flange surface 213 which contacts the clamp region of the disk 220, and a distal end portion 214 comprising a contact portion contacting a first support surface 203 of the spindle motor, a hole 215 fitted on a rotation shaft 202 of the spindle motor, and a member which includes a ferromagnetic member in at least a portion facing the spindle motor.

When a disk type identification means (not shown) determines the first disk, a clamper loading mechanism (not shown) is driven by a control means (not shown) in a state wherein the first disk is placed and held on the tray 250 (the clamper 210 is located at a broken line position in FIG. 9), thereby moving the clamper 210 downward.

When the distal end portion 214 of the clamper is fitted in the central hole of the disk and is further inserted, the balls 216, which are elastically biased outward in the radial direction of the disk, pass the central hole of the disk, and press the edge portion of the central hole on the opposite surface of the disk to bring the clamp region of the disk 220 into contact with the flange surface 213, thus holding the disk by the biasing force (see FIG. 9). In this state, the positions, in the radial direction of the disk and in the direction of the rotation shaft, of the disk 220 are determined with respect to the clamper 210.

The spindle motor 201 has the first support surface 203 which contacts the distal end portion 214 of the clamper to determine the position, in the direction of the rotation shaft, of the disk 220, a second support surface 204 which contacts the clamp region of a second disk 231 to determine the position, in the direction of the rotation shaft, of the disk, the rotation shaft 202 which is fitted in the central hole 215 of the clamper 210 and a central hole 232a of the hub of the second disk 231 to determine the radial position of the first and second disks, and a magnet 205 which magnetically attracts the clamper 210 and the hub of the second disk 231.

After the disk 220 is held by the clamper 210, the tray 250 is moved downward in the direction of the arrow D in FIG. 9 by the tray loading mechanism (not shown). After the tray 250 moves downward, the central hole 215 is fitted on the rotation shaft 202 to determine the radial position of the disk. At the same time, since the distal end portion 214 of the clamper 210 is constituted by the member including the ferromagnetic member, the distal end portion 214 of the clamper 210 is attracted by the magnet 205, and contacts the first support surface 203. Thus, the holding state of the disk on the spindle motor is maintained by the attraction force of the magnet 205, and at the same time, the position, in the direction of the rotation shaft, of the disk is determined. The tray 250 further moves downward and is separated away from the disk 220, thus completing the setting operation (see FIG. 10).

When the first disk is to be removed, the tray 250 is moved upward together with the clamper 210, which holds the disk 220, so as to separate the clamper 210 away from the spindle motor 201 against the attraction force of the magnet 205. In order to detach the disk 220 from the clamper 210, the tray 250 is moved upward to the position where the clamper 210 was attached to the disk 220 (see FIG. 9). When the clamper 210 further moves upward while holding the tray 250, the disk 220 contacts an interference member 251. When the clamper 210 further moves upward (in a direction opposite to an arrow C), the balls 216, which serve as an elastic holding mechanism of the central hole, are displaced inward in the radial direction of the central hole, and disengage from the central hole. As a result, the disk 220 drops onto and is held by the tray 250, thus completing the disengagement from the clamper 210.

A case will be explained below wherein the second disk is loaded. FIG. 11 shows the second disk 231, which has a hub 232 consisting of a magnetic material at its central portion, and is loaded in a disk cartridge 230.

When the second disk 231 is loaded into the disk apparatus and the disk identification means (not shown) determines that the second disk is loaded, the control means (not shown) controls the clamper loading mechanism (not shown) to maintain the clamper 210 in the holding state (the clamper 210 is indicated by a broken line in FIG. 12).

The disk cartridge 230 is moved downward by the tray loading mechanism (not shown), and the shaft of the spindle motor 201 is inserted into the opening formed at the center of the lower surface of the cartridge 230 (a description of a shutter opening/closing mechanism for closing the opening of the disk cartridge, a cartridge holding mechanism, and the like will be omitted).

When the hub 232 approaches the magnet 205 arranged on the spindle motor 201, the hub consisting of a ferromagnetic material is attracted by the magnetic force of the magnet 205, and its central hole 232a is fitted on the rotation shaft 202, thus determining the radial position of the disk. At the same time, the clamp region on the lower surface of the disk 231 contacts and engages with the second support surface 204 of the spindle motor, thus determining the position, in the direction of the rotation shaft, of the disk.

In the state wherein the second support surface 204 is in tight contact with the clamp region of the second disk by the magnetic attraction force, the holding state of the second disk 231 on the spindle motor 201 is maintained.

Detachment of the second disk is realized in such a manner that the hub 232 is separated against the attraction force of the magnet 205 by moving the cartridge 230 upward with respect to the spindle motor 201 using the tray loading mechanism. The above embodiment adopts the arrangement described above, but the mode of the present invention is not limited to this.

For example, the elastic holding portion for holding the first disk on the clamper may be supported by an easily deformable elastic member such as a synthetic resin, and a contact portion to the central hole of the disk may be constituted by arranging roughly spherical members at the positions of the balls 216 to be free to move inward in the radial direction of the disk. The compression coil spring 218 may be replaced by any other elastic members, as long as it has a function of biasing the pressing member 216. Furthermore, the distal end portion 214 of the clamper 210 may be constituted by a combination of a non-magnetic member such as a synthetic resin and a ferromagnetic member arranged at only the distal end portion facing the magnet 205 of the spindle motor 201, or a synthetic resin member formed by containing ferromagnetic powder, as a means other than that constituted by only a ferromagnetic material.

The first support surface 203 formed on the spindle motor 201 need only be arranged at an arbitrary position between the rotation shaft 202 and the second support surface 204, and may be, e.g., the surface, facing the clamper, of the magnet 205. In this case, the contact surface between the first support surface 203 and the distal end portion 214 of the clamper 210 must be located at a position in the direction of the rotation shaft, where it does not interfere with the hub 232 of the second disk.

What is claimed is:

1. A disk apparatus which records and/or reproduces with a first disk having a central hole, and a second disk, which has a central hole smaller than the central hole of the first disk and has a hub containing a magnetic material, comprising:

a spindle which is fitted in the central hole of the second disk to perform centering of the second disk; and a turntable arranged on said spindle, said turntable comprising:

a magnet for attracting the hub so as to hold the second disk on said turntable;

a first support surface which contacts a disk surface of the second disk at a position outside the hub and supports the second disk; and a caddie for holding the first disk upon loading the first disk into said apparatus, said caddie comprising:

a fitting portion which is fitted into the central hole of the first disk to perform centering of the first disk and comprises a magnetic portion to be attracted by said magnet; and a sub-turntable which is arranged to oppose said fitting portion to sandwich the held first disk therebetween, said sub-turntable being supported by said turntable upon loading said caddie into said apparatus, and clamping the first disk in cooperation with said fitting portion.

2. An apparatus according to claim 1, wherein said first support surface determines a height position of the second disk, and said sub-turntable comprises a second support surface which contacts a disk surface of the first disk to determine a height position of the first disk.

* * * * *

UNITED STATES PATENT AND TRADEMARK OFFICE
CERTIFICATE OF CORRECTION

PATENT NO. : 5,731,929
DATED : March 24, 1998
INVENTOR(S) : Masahiko Chaya

It is certified that error appears in the above-identified patent and that said Letters Patent is hereby corrected as shown below:

ON THE COVER PAGE

Item [56]: REFERENCES CITED

FOREIGN PATENT DOCUMENTS

"6150504" should read --6-150504--.

COLUMN 2

Line 3, "despite" should read --despite how--.

COLUMN 3

Line 46, "view" should read --view showing--.

Signed and Sealed this

Seventeenth Day of August, 1999

Attest:

Q. TODD DICKINSON

*Attesting Officer*  *Acting Commissioner of Patents and Trademarks*